(12) United States Patent
Endou

(10) Patent No.: US 8,527,806 B2
(45) Date of Patent: Sep. 3, 2013

(54) INFORMATION PROCESSING DEVICE AND MEMORY ANOMALY MONITORING METHOD

(75) Inventor: Shin Endou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 413 days.

(21) Appl. No.: 11/902,393

(22) Filed: Sep. 21, 2007

(65) Prior Publication Data
US 2008/0022154 A1 Jan. 24, 2008

Related U.S. Application Data

(63) Continuation of application No. PCT/JP2005/005352, filed on Mar. 24, 2005.

(51) Int. Cl.
G06F 11/00 (2006.01)

(52) U.S. Cl.
USPC ............................................. 714/5.1; 714/42

(58) Field of Classification Search
USPC ............................................................ 714/5
See application file for complete search history.

(56) References Cited

U.S. PATENT DOCUMENTS

| | | | |
|---|---|---|---|
| 3,478,324 A * | 11/1969 | Couleur et al. ................. | 714/49 |
| 5,278,961 A * | 1/1994 | Mueller ......................... | 711/206 |
| 5,351,137 A * | 9/1994 | Kato et al. ..................... | 382/252 |
| 5,644,539 A * | 7/1997 | Yamagami et al. ............. | 365/200 |
| 5,706,407 A | 1/1998 | Nakamura et al. | |
| 5,737,585 A * | 4/1998 | Kaneshima ..................... | 703/20 |
| 5,978,952 A * | 11/1999 | Hayek et al. ................... | 714/764 |
| 6,130,837 A * | 10/2000 | Yamagami et al. ...... | 365/185.09 |
| 6,158,025 A | 12/2000 | Brisse et al. | |
| 6,330,641 B1 * | 12/2001 | Yoshioka ....................... | 711/113 |
| 6,779,148 B2 * | 8/2004 | Tanaka ........................... | 714/753 |
| 6,785,892 B1 * | 8/2004 | Miller et al. ................... | 719/313 |
| 6,912,614 B2 * | 6/2005 | Tomita ............................. | 711/4 |
| 7,080,291 B2 * | 7/2006 | Moriki et al. .................... | 714/53 |
| 7,328,380 B2 * | 2/2008 | Pomaranski et al. .......... | 714/718 |
| 2002/0157051 A1 * | 10/2002 | Eckelman et al. ............. | 714/736 |
| 2003/0046621 A1 * | 3/2003 | Finkler et al. ................... | 714/723 |

(Continued)

FOREIGN PATENT DOCUMENTS

| | | |
|---|---|---|
| JP | 54-62735 A | 5/1979 |
| JP | 8-83218 A | 3/1996 |
| JP | 2000-57016 A | 2/2000 |
| JP | 2002-140283 A | 5/2002 |
| WO | 98-29811 A1 | 7/1998 |

OTHER PUBLICATIONS

Korean Office Action dated Dec. 12, 2008, issued in corresponding Korean Patent Application No. 10-2007-7021685.
European Search Report dated Aug. 6, 2009, issued in corresponding European Patent Application No. 05721366.2.
International Search Report of PCT/JP2005/005352, date of mailing Jun. 14, 2005.

*Primary Examiner* — Kamini Patel
(74) *Attorney, Agent, or Firm* — Westerman, Hattori, Daniels & Adrian, LLP

(57) ABSTRACT

The present invention provides an information processing device having a CPU which executes an OS and firmware, and a plurality of memory controllers which are connected to the CPU, control writing to and reading from a plurality of memory units, and perform error monitoring, wherein the plurality of memory units each connected to the plurality of memory controllers, the memory controllers sequentially read memory areas of the plurality of memory units connected to the memory controllers, and perform error area monitoring, and the firmware converts addresses recognized by the memory controllers corresponding to the error areas into logical addresses recognized by the OS, and supplies the logical addresses to the OS.

10 Claims, 8 Drawing Sheets

(56) References Cited

U.S. PATENT DOCUMENTS

| | | |
|---|---|---|
| 2003/0074601 A1 | 4/2003 | Schultz et al. |
| 2003/0105921 A1* | 6/2003 | Tomita ........................ 711/114 |
| 2004/0153853 A1* | 8/2004 | Moriki et al. .................. 714/43 |
| 2005/0028039 A1* | 2/2005 | Henderson et al. ............. 714/42 |
| 2005/0060603 A1* | 3/2005 | Pomaranski et al. ............. 714/7 |
| 2005/0188278 A1* | 8/2005 | Zimmer et al. ................. 714/42 |
| 2008/0177956 A1* | 7/2008 | Peddle ......................... 711/156 |
| 2009/0164837 A1* | 6/2009 | Swanson et al. .................. 714/6 |

* cited by examiner

INFORMATION PROCESSING DEVICE AND MEMORY ANOMALY MONITORING METHOD

CROSS REFERENCE TO RELATED APPLICATIONS

This application is a continuation of International Application No. PCT/JP2005/005352, filed on Mar. 24, 2005, now pending, herein incorporated by reference.

TECHNICAL FIELD

The present invention relates to an information processing device using a memory controller, and in particular relates to an information processing device which monitors memory anomalies regardless of the mounted memory capacity.

BACKGROUND ART

With increases in the scale of systems in recent years, there has been an increase in the capacity of mounted memory, and high reliability is also sought. Prompt detection of the location of malfunctions in memory is essential for maintaining high reliability of large amounts of memory. To this end, memory diagnostics and monitoring are indispensable.

FIG. 1 explains memory monitoring in the prior art. An operating system (hereafter "OS") is running in the CPU 3. The CPU 3 is connected to memory units 2i to 2l.

In memory anomaly monitoring of the prior art the CPU monitors all memory areas in the memory units 2i to 2l in response to instructions from the OS. In this case, read processing is performed by the OS via the CPU 3 of all areas in the mounted memory units 2i to 2l. An area from which reading is not possible is diagnosed as an error area, and degradation processing to remove the error area from the usable area is performed.

The OS holds information on areas which the OS has itself an information of degraded area, and itself secures the continuity of logical addresses. Further, the OS ascertains in advance the mounted memory capacity and hardware configuration.

In such a method in which the CPU monitors all memory areas under instruction from the OS, the load occurring at the time of operation is excessive in a large-scale system which a huge memory capacity. Moreover, there is the problem that too much time is required for monitoring processing. In order to alleviate the load on the CPU, memory monitoring in which hardware other than the CPU performs reading of memory areas is conceivable. By having hardware other than the CPU read memory areas and confirm the presence or absence of errors in the read-out data, the load on the CPU can be alleviated.

FIG. 2 is an example of memory monitoring performed by hardware other than the CPU. The OS is running in the CPU 3. And, controllers C1 to C3, which are the hardware performing control and monitor of memory, are connected to the CPU 3. Controller C1 is connected to memory units 2m and 2n, controller C2 is connected to memory units 2o and 2p, and controller C3 is connected to memory units 2q and 2r.

The controller C1 to C3 control access to connected memory units according to requests from the OS during normal access, but during memory monitoring perform data reading from memory units, and upon detecting an error change specific bits in a register of the controller and notify the OS.

In this case also, the OS has ascertained in advance the amount of memory mounted and the hardware configuration. Further, the OS itself holds information on previously degraded areas, and itself secures the continuity of logical addresses.

The technology described in Japanese Patent Laid-open No. 2000-57016 is a hardware monitoring system which alleviates the load on the CPU. This technology suppresses frequent interruptions of applications due to errors and reduces the load on the CPU by causing error processing to be performed by firmware. However, the technology of Japanese Patent Laid-open No. 2000-57016 relates to hardware in general, and does not perform monitoring of memory.

As shown in FIG. 2, even when hardware other than the CPU is used to perform memory anomaly monitoring, there is the possibility that memory addresses may be changed from the addresses of the previous architecture due to memory expansion. In order to accommodate memory expansion, conversion into logical addresses corresponding to each architecture must be performed; if the OS is caused to execute this conversion, however, not all architectures can be accommodated by a common OS. Moreover, if measures are taken to accommodate changes in architecture due to hardware, then the need arises to install additional hardware for each architecture, resulting in cost increases and increases in development processes.

DISCLOSURE OF THE INVENTION

Hence an object of this invention is to provide an information processing device capable of memory monitoring by means other than the OS and hardware, which accommodates different architectures, without direct memory monitoring by a CPU.

In order to resolve the above problems, according to a first aspect of the present invention, an information processing device, having: a CPU which executes an OS and firmware; and a plurality of memory controllers which are connected to the CPU, control writing to and reading from a plurality of memory units, and perform error monitoring, wherein the plurality of memory units each connected to the plurality of memory controllers, the memory controllers sequentially read memory areas of the plurality of memory units connected to the memory controllers, and perform error area monitoring; and the firmware converts addresses recognized by the memory controllers corresponding to the error areas into logical addresses recognized by the OS, and supplies the addresses to the OS.

In a preferred embodiment of the above first aspect of the present invention, the firmware judges whether the error areas detected by the memory controllers are areas which have been detected to be error areas by previous reading and have been excluded from usage areas, and resumes reading of the memory areas if the area have been excluded.

In a further preferred embodiment of the above first aspect of the invention, the firmware judges whether data in the error areas is restored, and the memory controller detecting the error area performs rewriting of the error area if the data in the error area is restorable.

In a further preferred embodiment of the above first aspect of the present invention, the plurality of memory controllers each perform monitoring of memory errors independently.

In a preferred embodiment of a second aspect of the present invention is a memory anomaly monitoring method in an information processing device having a CPU which executes an OS and firmware, a plurality of memory controllers which are connected to the CPU, control writing to and reading from a plurality of memory units, and perform error monitoring, and a plurality of memory units each connected to the plurality of memory controllers, the method having the steps of sequential reading memory areas in the plurality of memory units connected to the memory controllers and performing error area monitoring, by the memory controllers; and converting address recognized by the memory controllers into the error areas into logical addresses recognized by the OS, and supplying the logical addresses to the OS, by the firmware.

In a preferred embodiment of the second aspect of the present invention, further having a step of degradation judgment process of judging whether the error area detected by the memory controller is an area which have been detected as an error area by previous reading and has been excluded from usable areas, and resuming memory area reading if the area is previously excluded, by the firmware.

In a preferred embodiment of the second aspect of the invention, further having a step of restoration judgment of judging, by the firmware, whether data of the error areas can be restored, and performing rewriting of the error data, by the memory controller which has been detected the error area, if the data of an error area can be restored.

By using firmware to modify logical addresses accompanying changes in architecture, an information processing device of the present invention can enable introduction of additional hardware without resulting in cost increases or increases in development processes, and enables a common OS to be applied to all architectures.

BEST MODE FOR CARRYING OUT THE INVENTION

Figure 1:
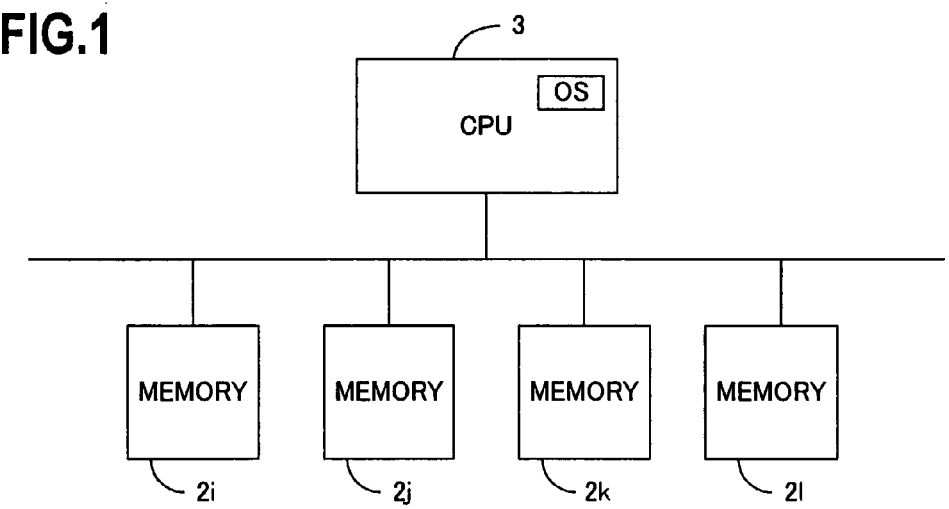
FIG. 1 explains memory monitoring in the prior art.
Figure 2:
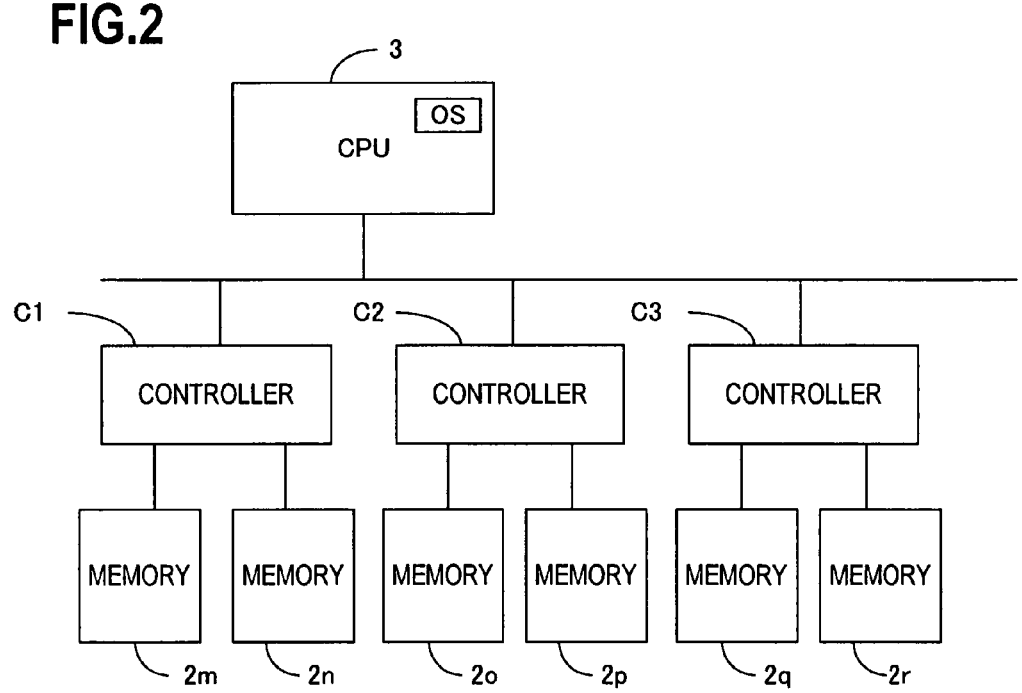
FIG. 2 is an example of memory monitoring performed by hardware other than the CPU in which memory areas are accessed.

Below, aspects of the invention are explained referring to the drawings. However, the technical scope of the present invention is not limited to these aspects, but extends to the present inventions described in the scope of claims, and to present inventions equivalent thereto.

Figure 3:
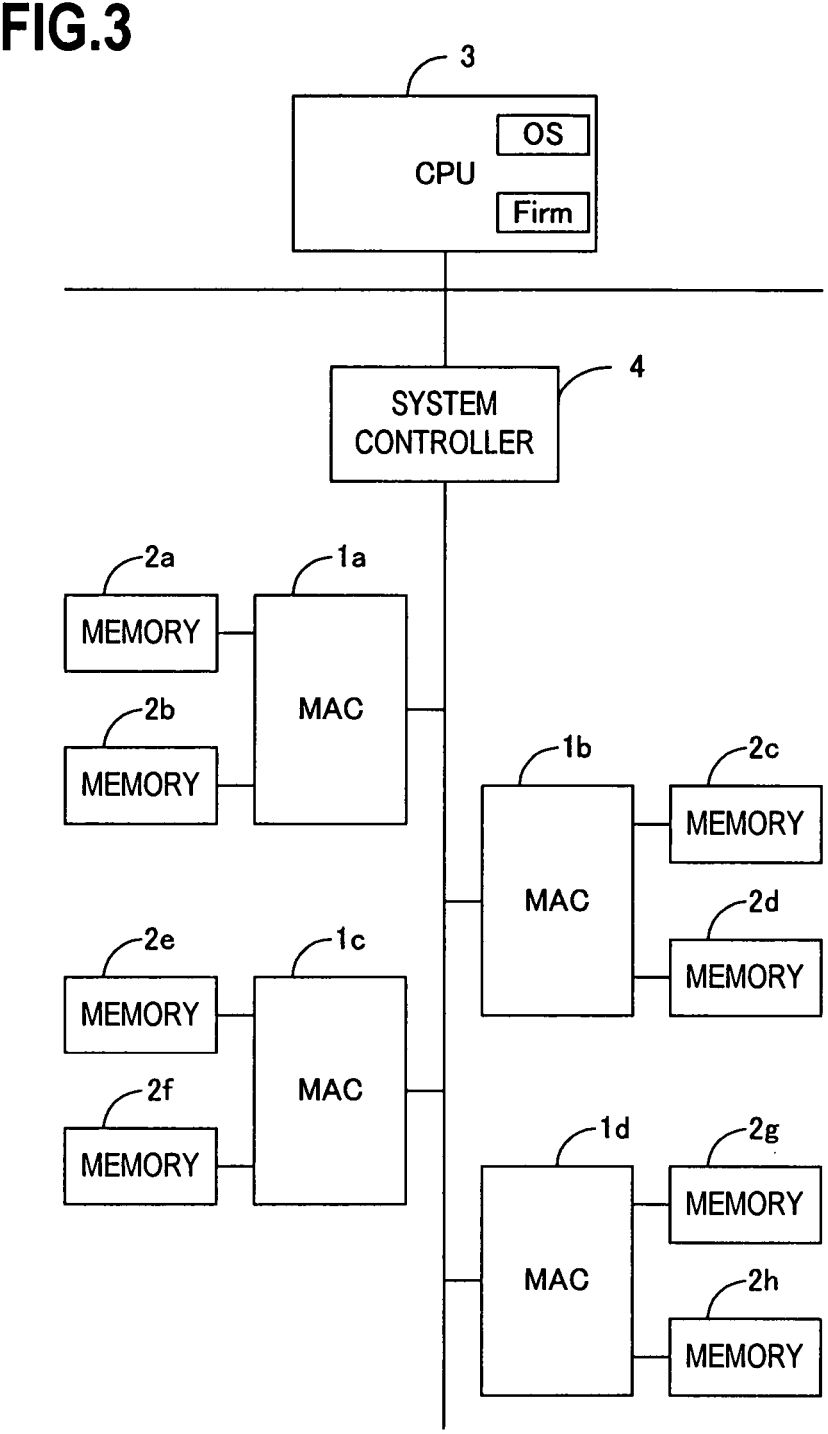
FIG. 3 shows the configuration of an information processing device of an aspect of this invention.

FIG. 3 shows the configuration of the information processing device of an aspect of the invention. The information processing device of this aspect has a CPU 3, which executes commands of the OS and firmware (indicated by "Firm" in the figure). The CPU 3 is connected to a plurality of memory controllers ("MAC" in the figure) 1a to 1d via a system controller 4. The system controller 4 converts logical addresses received from the CPU 3 into memory controller addresses used within the respective memory controllers 1a to 1d. The memory controllers 1a to 1d are hardware which performs management of writing to and reading from, and memory monitoring of, memory units 2a to 2h.

Figure 4:
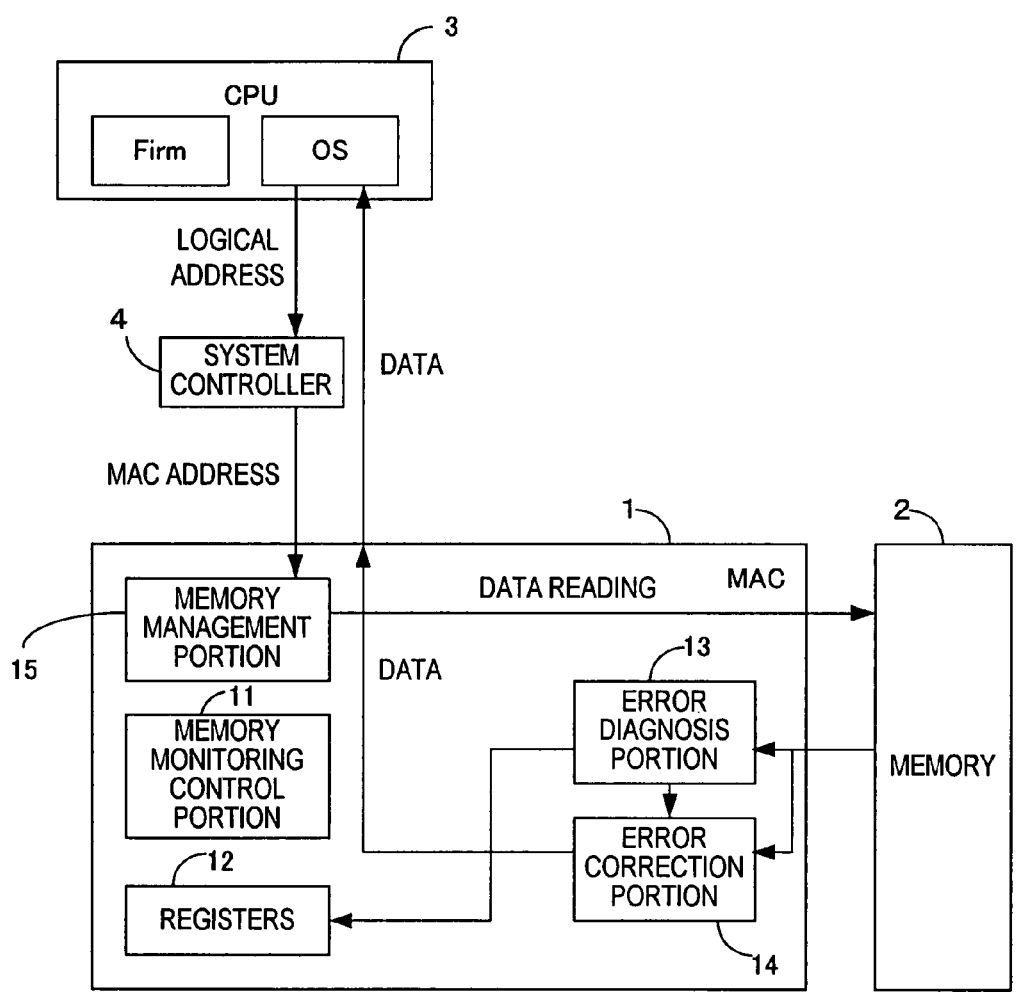
FIG. 4 shows the configuration of a memory controller and operation during normal access.

FIG. 4 shows the memory controller configuration and operation during normal access. The memory controller 1 primarily has a memory monitoring control portion 11, registers 12, error diagnosis portion 13, error correction portion 14, and memory management portion 15. During normal access, when the OS accesses memory 2 via the CPU 3, first the logical address of the area to be accessed is provided to the system controller 4 from the CPU 3. The system controller 4 receives the logical address, and converts the address into a corresponding memory controller address ("MAC address" in the figure) in the memory controller 1. On receiving the supplied memory controller address, the memory management portion 15 in the memory controller 1 accesses the data in the corresponding area in memory 2. The memory 2 supplies the data of the corresponding area to the error diagnosis portion 13 and error correction portion 14 in the memory controller 1.

When no errors exist in the data supplied from the memory 2, the data is output from the memory controller 1 and is received by the OS via the CPU 3.

When an error exists in the data supplied from the memory 2, the error diagnosis portion 13 detects the error and judges whether the error can be corrected. If the detected error cannot be corrected, the error correction portion 14 appends information indicating that the data includes an uncorrectable error, and transmits the data to the OS. At this time, the error diagnosis portion 13 records, in the registers 12, whether the error has been corrected, address information for the error area, whether the error occurred during normal access or occurred during memory diagnostics, and other information.

If the error in the supplied data can be corrected, the error correction portion 14 outputs the corrected data from the memory controller 1, to supply the data to the OS via the CPU 3. At this time, the error diagnosis portion 13 records, in the registers 12, whether the error has been corrected, address information for the error area, whether the error occurred during normal access or occurred during memory diagnostics, and other information.

During normal operation, the memory monitoring control portion 11 is not used.

Figure 5:
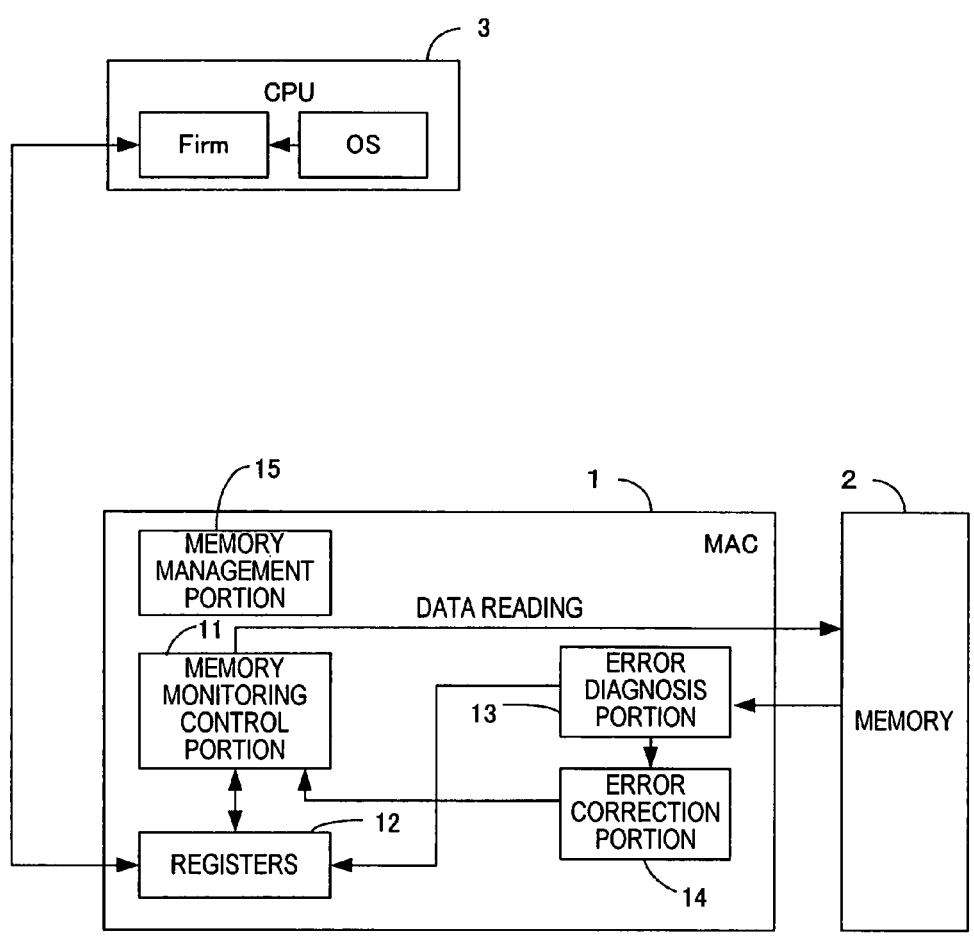
FIG. 5 shows the configuration of a memory controller and operation during memory monitoring.

FIG. 5 shows the configuration of the memory controller and operation during memory monitoring. The OS issues an instruction to the firmware, via the CPU 3, to begin memory monitoring. The firmware writes to the registers 12 within the memory controller 1 via the CPU 3, and causes memory monitoring to begin. Upon confirming writing to the registers 12 from the firmware, the memory monitoring control portion 11 performs sequential reading of data from the memory 2. The memory 2 supplies data corresponding to memory controller addresses supplied from the memory monitoring control portion 11 to the error diagnosis portion 13 and error correction portion 14 within the memory controller 1.

When no errors exist in the data supplied to the error diagnosis portion 13, the error diagnosis portion 13 notifies the memory monitoring control portion 11 of the fact that no errors exist. Upon receiving this information, the memory monitoring control portion 11 accesses memory 2 to read from the next area.

When an error exists in the data supplied to the error diagnosis portion 13, the error diagnosis portion 13 judges whether the error can be corrected. Then, the error diagnosis portion 13 notifies the memory monitoring control portion 11 of the fact that an error exists, whether the error can be corrected, address information for the error area, whether the error occurred during normal access or during memory monitoring, and other information. Upon receiving this information, the memory monitoring control portion 11 temporarily interrupts memory monitoring. Then, the memory monitoring control portion 11 writes the information obtained from the error diagnosis portion 13 to the registers 12.

The memory controller 1 has registers 12 to exchange information with the firmware and OS. There are three types of control registers which start and stop monitoring and perform other control; these are the monitoring control register RG1, restart address register RG2, and rewrite address register RG3.

In the monitoring control register RG1 there exist a monitoring start bit B1, restart address bit B2, monitoring stop bit B3, monitoring state bit B4, rewrite bit B5, rewrite reset bit B6, correctable error bit B7, uncorrectable error bit B8, and comparison error bit B9, and other bits.

Further, log registers which hold error information and similar exist among the registers 12 within the memory controller 1. There are primarily four types of log registers, which are an error address register RG4, error log register RG5, permanent fault address register RG6, and permanent fault log register RG7.

Figure 6:
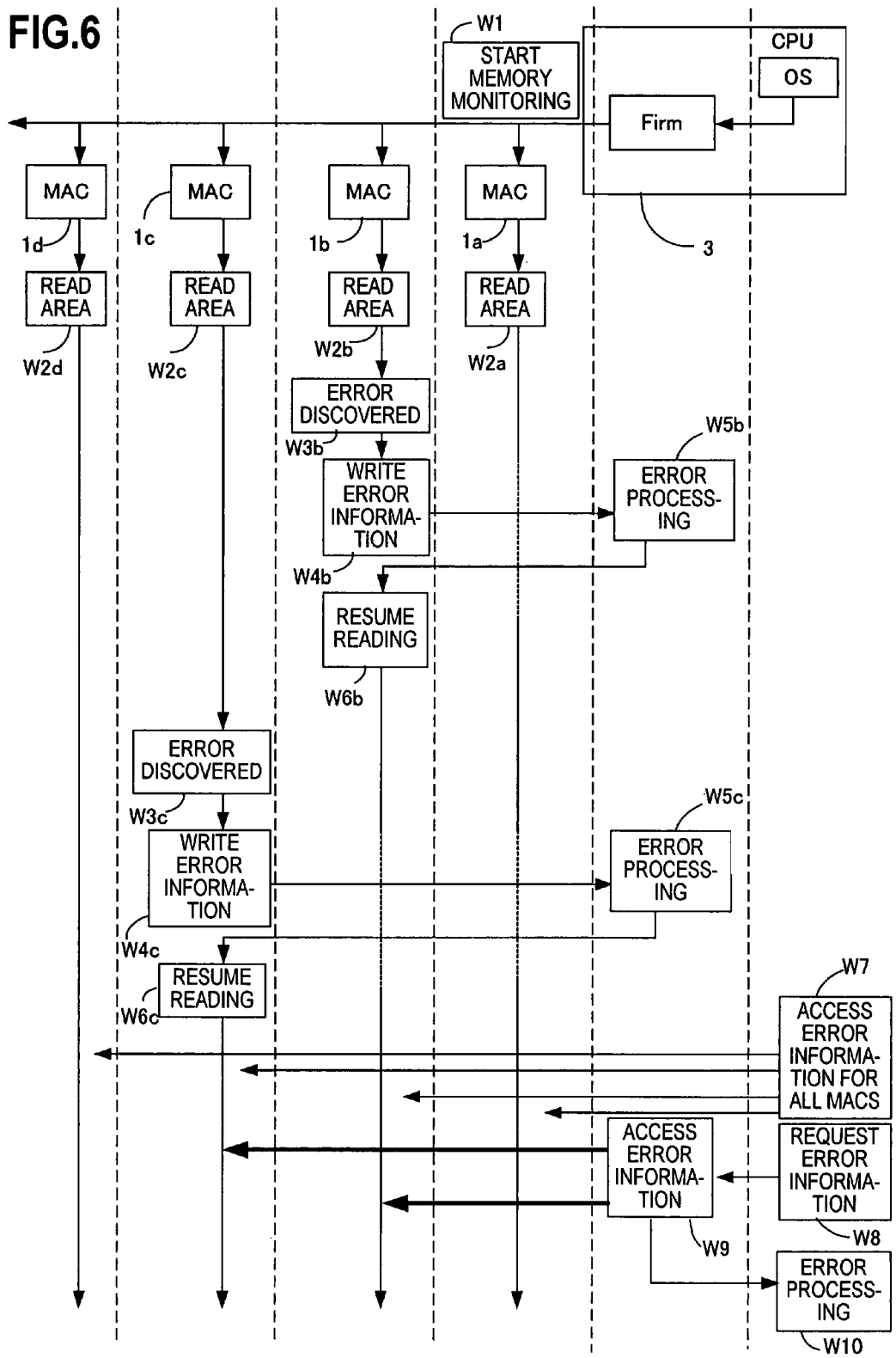
FIG. 6 shows briefly the flow of operation for memory monitoring in an aspect of the invention.

FIG. 6 shows briefly the flow of operation for memory monitoring in an aspect of the invention. In this figure, steps are explained in a time series from top to bottom; columns separated by dashed lines indicate steps performed by the same hardware or the same software. Upon receiving an instruction from the OS, the firmware writes to the registers 12 of all the memory controllers 1a to 1d, issuing an instruction to start memory monitoring (step W1). On receiving this memory monitoring start instruction, the memory controllers 1a to 1d start reading from areas of memory 2 to which they are connected (steps W2a to W2d). When an error is detected in memory controller 1b (step W3b), the memory monitoring control portion 11 writes, to a register 12 in the memory controller 1b, information indicating whether the error can be corrected, address information for the error area, whether the error occurred during normal access or during memory monitoring, and other information (step W4b). The information written to the register 12 is accessed by the firmware, degradation information is checked, and after a rewrite instruction and other error processing has been performed (step W5b), memory monitoring is resumed (step W6b).

When an error is detected by another memory controller also (step W3c), information is similarly written to the register 12 in the memory controller 1c by the memory monitoring control portion 11 (step W4c), indicating whether the error can be corrected, the error area address information, whether the error occurred during normal access or during memory monitoring, and similar. The information written to the register 12 is accessed by the firmware, degradation information is checked, a rewrite instruction is issued, and other error processing is performed (step W5c), after which memory monitoring is resumed (step W6c).

The OS accesses the registers 12 of all memory controllers 1a to 1d at fixed intervals to check whether errors have occurred (step W7). When errors are confirmed to have occurred in memory controllers 1b and 1c, information relating to these errors is requested of the firmware (step W8). Upon receiving the request for information relating to the errors, the firmware accesses the memory controllers 1b and 1c for which errors occurred, and provides the OS with information relating to the errors (step W9). Upon receiving this information, the OS-performs processing to cause degradation and similar (step W10).

Here, a rare case in which two errors are simultaneously detected in the same memory controller is explained. When, prior to accessing of error information by the OS in step W7, another error is detected by the memory controller 1b, the information written to the register 12 in step W4b is overwritten, and the OS obtains only the information for the error which occurred later.

Figure 7:
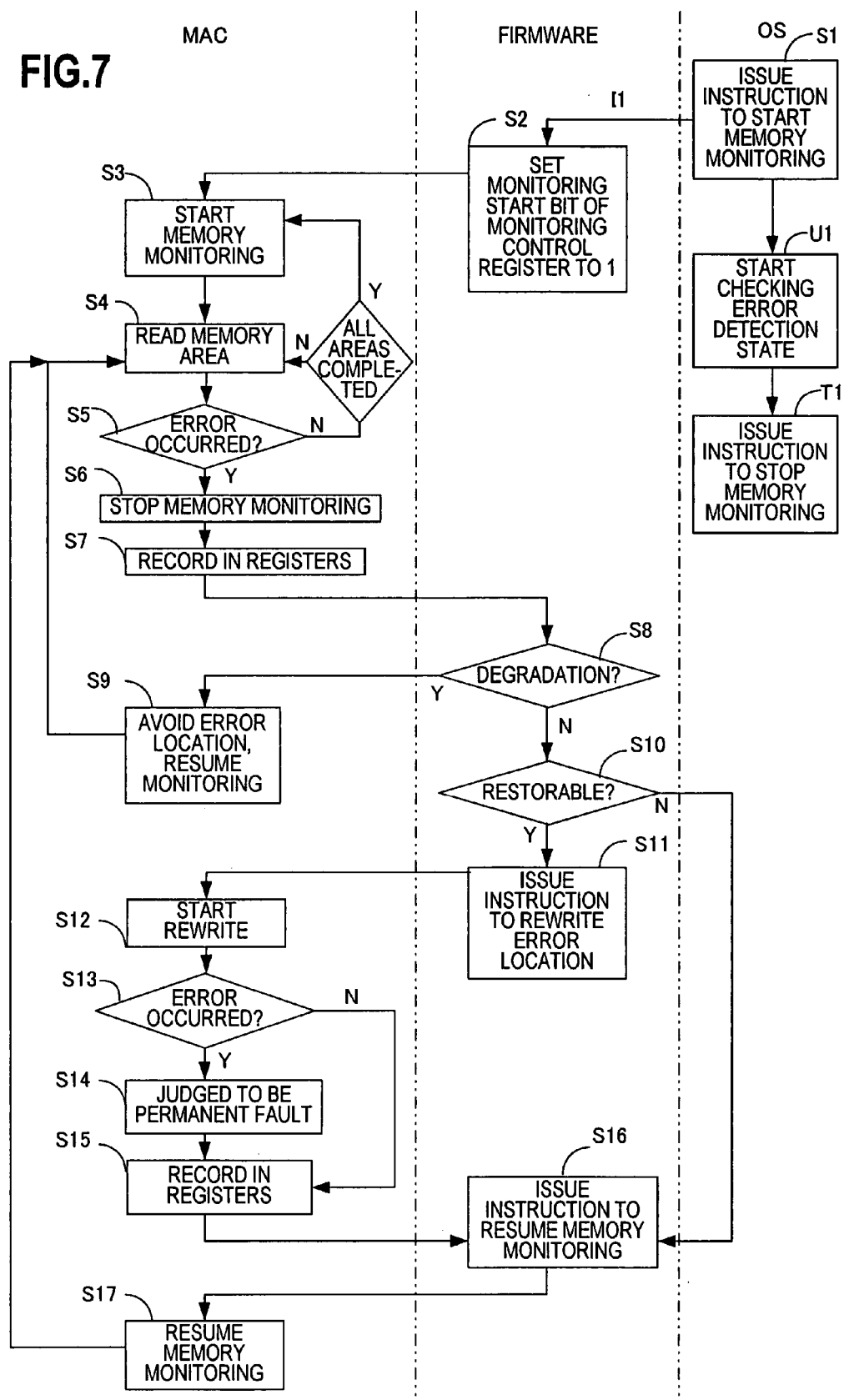
FIG. 7 shows in detail the flow of operation for memory monitoring in an aspect of the invention.

FIG. 7 shows the detailed flow of operation for memory monitoring in an aspect of the invention. First, a decision is made by the OS to start memory monitoring (step S1). At this time, the OS sends a memory monitoring start instruction I1 to the firmware via the CPU. Upon receiving the memory monitoring start instruction I1, the firmware sets the monitoring start bit B1 in the monitoring control register RG1 within the memory controller 1 to "1" (step S2).

After deciding to start memory monitoring, the OS starts checking the error state (step U1), and ends memory monitoring (step T1); this processing is explained later using FIG. 8 and FIG. 9.

The memory controller 1, in response to the fact that the monitoring start bit B1 of the monitoring control register RG1 has become "1", starts memory monitoring (step S3). After being started, memory monitoring continues until the OS sends a memory monitoring stop instruction I2 to the firmware; during this interval, the memory controller 1 reads areas of memory (step S4), and when reading of all areas has ended, waits for a fixed interval of time, and then begins reading again (step S3).

At this time, the error diagnosis portion 13 within the memory controller 1 checks whether errors have occurred in memory 2 (step S5), and when an error occurs, the memory monitoring control portion 11 stops memory monitoring (step S6). Then, the memory monitoring control portion 11 sets either the correctable error bit B7 or the uncorrectable error bit B8 of the monitoring control register RG1 to "1", according to the type of error (step S7). Error position information is recorded in the error address register RG4, error log register RG5, and similar.

Next, in response to the fact that the correctable error bit B7 or the uncorrectable error bit B8 of the monitoring control register has become 1, the firmware performs degradation confirmation. Degradation is that the error area in memory 2 is excluded from the usable area. The firmware judges whether the area is an area which has already been degraded, based on information recorded in the monitoring control register RG1 of the memory controller 1 (step S8).

When the error area is a degraded area, the firmware avoids the area and resumes memory monitoring (step S9). At this time, the address information for the area for resumption is set in the restart address register RG2 of the memory controller 1, and the restart address bit B2 of the monitoring control register RG1 is set to "1". In response to this register information, the memory monitoring control portion 11 resumes memory monitoring.

When the error area is not the degraded area, a check is performed via the registers 12 as to whether the error can be corrected (step S10). Here correctable errors are explained. In this aspect, ECC (Error Check and Correct) memory is used to accomplish error detection. A correctable error is a soft error which occurs irregularly due to changes in data stored in memory. The soft error is a data error which does not occur because of a problem with the circuitry, and which does not reoccur when the data is corrected using data correction functions. Using error correction functions, error correction of a detected correctable error is performed based on the correction code. The correction code is code generated within the MAC when processing data between the MAC and memory.

If the error is the correctable error, then the data which should have been written can be determined, and so the firmware issues an instruction to the memory controller 1 to write this data one more time (step S11). At this time, the address of the area for rewriting is set in the rewrite address register RG3, and the rewrite bit of the monitoring control register RG1 is set to "1". The memory monitoring control portion 11 within the memory controller 1 performs writing processing to these registers, and the memory monitoring control portion 11 begins rewriting of the data that should have been written. At this time, monitoring for another error occurrence is performed (step S13), and if the error occurs, the error is judged to be a permanent fault arising in the hardware (step S14), and the error is recorded in the permanent fault address register RG6 or the permanent fault register RG7 (step S15). In step S13, when no error has occurred, the soft error is judged to have occurred. This information is recorded in the error address register RG4 and error log register RG5 (step S15). In step S15, after recording in the registers 11, the firmware issues an instruction to the memory controller 1 to resume memory monitoring (step S16).

When in step S10 the error is judged to be the uncorrectable error, rewriting of the error area is not performed, and the firmware issues an instruction to the memory controller 1 to resume memory monitoring (step S16).

The memory controller 1 resumes memory monitoring (step S17), and returns to detection of error occurrences (step S5). This flow of operation of memory monitoring is repeated until memory monitoring stop processing is performed.

Figure 8:
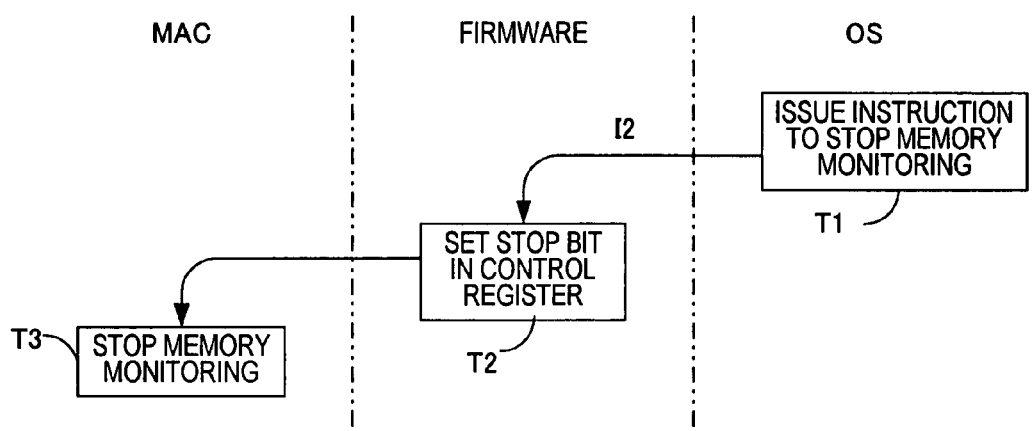
FIG. 8 shows the flow of operation for memory monitoring halting in an aspect of the invention; and, FIG. 9 shows the flow of operation for OS error monitoring during memory monitoring in an aspect of the invention.

FIG. 8 shows the flow of operation for memory monitoring stoppage in an aspect of the present invention. First, the OS decided to stop memory monitoring (step T1). At this time, the OS sends the memory monitoring stop instruction I2 to the firmware via the CPU. Upon receiving the memory monitoring stop instruction I2, the firmware sets the monitoring stop bit B3 of the monitoring control register RG1 in the memory controller 1 to "1" (step T2). In response to the fact that the monitoring stop bit B3 of the monitoring control register RG1 has changed to "1", the memory monitoring portion 11 within the memory controller 1 stops memory monitoring (step T3).

Figure 9:
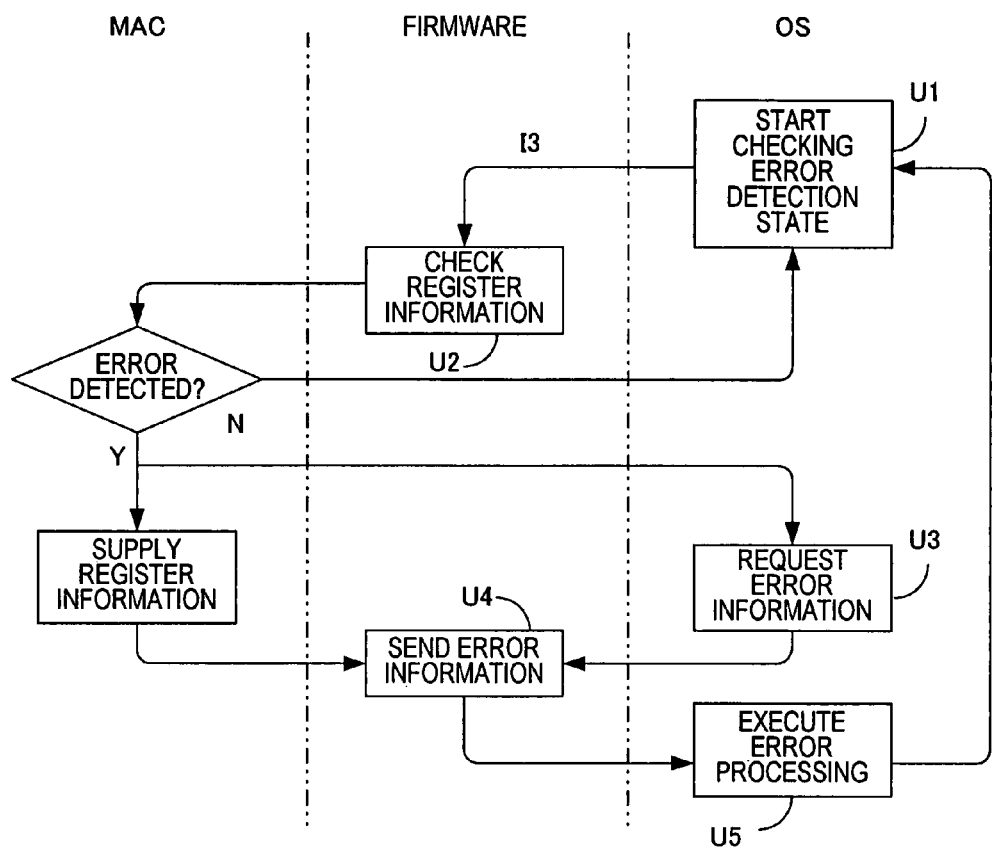

FIG. 9 shows the flow of operations for OS error-monitoring in memory monitoring of an aspect of the present invention. The OS starts monitoring of the error detection state after the start of memory monitoring (step U1). At this time, the OS sends a memory monitoring confirmation instruction I3 to the firmware via the CPU. Upon receiving the memory monitoring confirmation instruction I3, the firmware monitors each bit of the monitoring control register RG1 in the memory controller 1 (step U2). At this time, if no error is detected processing returns to step U1, and after a fixed length of time, confirmation of the error detection state is again begun.

When an error is detected in the memory controller 1, the OS issues an error information request to the firmware (step U3). Upon receiving this request, the firmware creates error information to be sent to the OS from information stored in the registers 12 of the memory controller 1, and sends the information (step U4). Here, error information is the logical address which can be recognized by the OS, whether the error is the permanent fault or the soft error, and similar. The error information is sent from the firmware to the OS, and the OS performs logical address and other processing based on this (step U5). After step U5, processing returns to step U1, and after the fixed time has elapsed, confirmation of the error detection state is again begun.

The firmware integrates information from all the memory controllers 1, performs conversion into logical addresses and passes the error information to the OS, so that the OS need not perform conversions into logical addresses. Further, the firmware performs address conversion of the positions of errors detected by the memory controller 1 according to the architecture, and provides the logical addresses after processing to the OS. The OS executes error processing based on logical addresses received from the firmware.

In this way, by using firmware to modify logical addresses accompanying changes in architecture, additional hardware can be introduced without resulting in cost increases or increases in the number of development processes, and a common OS can be applied to all architectures.

INDUSTRIAL APPLICABILITY

In a large-scale system, high reliability is demanded given the large number of memory units installed. Rapid detection of fault locations in memory is essential for maintaining high reliability of large quantities of memory, and to this end memory diagnosis and monitoring are indispensable. This invention enables memory monitoring using a common OS, regardless of differences in hardware configuration.

The invention claimed is:

1. An information processing device, comprising:
   a processor which executes an OS and firmware; and
   a plurality of memory units where each of the memory units is coupled to a memory controller and has a memory area capable of having different memory size due to memory expansion, wherein
   the memory controller which is coupled to the processor, controls writing to and reading from each of the memory areas of the plurality of memory units, and performs error monitoring for monitoring error memory area in the each of memory areas,
   the memory controller detects the physical address of the error memory area,
   the firmware performs address conversion to convert the physical address of the error memory area into a logical address recognized by the OS on the basis of the memory size with expanded memory and supplies the logical address to the OS, and
   the OS executes error processing on the basis of the logical address received from the firmware.

2. The information processing device according to claim 1, wherein the firmware judges whether the physical address of the error memory area detected by the memory controller is a memory area which has been detected to be error memory area by previous reading and has been excluded from usable memory area, and resumes reading of memory areas if the error memory areas have been excluded.

3. The information processing device according to claim 1, wherein the firmware judges whether the physical address of the error memory area detected by the memory controller is the memory area which has been detected to be the error memory area by previous reading, the error memory areas judged on the basis of information recorded in the plurality of memory units.

4. The information processing device according to claim 1, wherein the firmware avoids using the plurality of memory areas of the plurality of memory units for writing and reading data when the physical address of the error memory area detected by the memory controller is the memory area which has been detected to be the error memory area by previous reading.

5. A memory anomaly monitoring method in an information processing device having a processor which executes an OS and firmware, a plurality of memory units where each of the memory units is coupled to a memory controller and has a memory area capable of having different memory size due to memory expansion, the memory controller which is coupled to the processor, controls writing to and reading from each of the memory areas of the plurality of memory units, and performs error monitoring for monitoring error memory area in the each of memory areas, the method comprising:

detecting the physical address of the error memory area, by the memory controller, performing address conversion to convert the physical address of the error memory area into a logical address recognized by the OS on the basis of the memory size with expanded memory, and supplying the logical address to the OS, by the firmware, and executing error processing on the basis of the logical address received from the firmware, by the OS.

6. The memory anomaly monitoring method according to claim 5, further comprising judging whether the physical address of the error memory area detected by the memory controller is a memory area which has been detected to be error memory area by previous reading and has been excluded from usable memory, and resuming reading of memory area if the error memory area has been excluded, by the firmware.

7. The memory anomaly monitoring method according to claim 5, further comprising judging, by the firmware, whether the physical address of the error memory area detected by the memory controller is the memory area which has been detected to be the error memory area by previous reading, the error memory area judged on the basis of information recorded in the plurality of memory units.

8. The information processing device according to claim 1, wherein the memory controller includes a register, and the OS issues an instruction to the firmware, via the processor, to begin error monitoring, and the firmware writes the instruction to the register, via the processor, to cause error monitoring to begin.

9. The information processing device according to claim 4, wherein the firmware resumes the memory monitoring when the physical address of the error memory area detected by the memory controller is the memory area which has been detected to be the error memory area by the previous reading.

10. The information processing device according to claim 4, wherein the firmware resumes the memory monitoring on the basis of information recorded in the plurality of memory units.

* * * * *